US012798203B2

(12) United States Patent
Yourdkhani et al.

(10) Patent No.: US 12,798,203 B2
(45) Date of Patent: Nov. 17, 2026

(54) DEVICE AND METHOD FOR RAPID MANUFACTURING OF MULTIFUNCTIONAL COMPOSITES

(71) Applicant: Colorado State University Research Foundation, Fort Collins, CO (US)

(72) Inventors: Mostafa Yourdkhani, Windsor, CO (US); Iman Naseri, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 14 days.

(21) Appl. No.: 17/386,820

(22) Filed: Jul. 28, 2021

(65) Prior Publication Data

US 2022/0032563 A1 Feb. 3, 2022

Related U.S. Application Data

(60) Provisional application No. 63/057,658, filed on Jul. 28, 2020.

(51) Int. Cl.
*B29C 70/72* (2006.01)
*B29C 35/02* (2006.01)
*B29C 63/00* (2006.01)
*B29C 70/68* (2006.01)

(52) U.S. Cl.
CPC ........ *B29C 70/685* (2013.01); *B29C 35/0272* (2013.01); *B29C 35/0288* (2013.01); *B29C 63/0065* (2013.01); *B29C 70/681* (2013.01); *B29C 2035/0211* (2013.01)

(58) Field of Classification Search
CPC . B29C 70/685; B29C 70/681; B29C 35/0272; B29C 35/0288; B29C 2035/0211; B29C 70/72
See application file for complete search history.

(56) References Cited

U.S. PATENT DOCUMENTS

2011/0088841 A1* 4/2011 Thunhorst ............. B29B 15/125
427/346
2016/0339615 A1* 11/2016 Abe ...................... B29C 70/443
2018/0230642 A1* 8/2018 Robertson .............. C08G 61/08

OTHER PUBLICATIONS

Nguyen, N., A. Hao, J.G. Park, R. Liang, In Situ Curing and Out-of-Autoclave of Interply Carbon Fiber/Carbon Nanotube Buckypaper Hybrid Composites Using Electrical Current, Advanced Engineering Materials, vol. 18, No. 11 (2016), pp. 1906-1912. (Year: 2016).*

(Continued)

*Primary Examiner* — Matthew J Daniels
(74) *Attorney, Agent, or Firm* — Robinson IP Law, PLLC

(57) ABSTRACT

Various implementations include a method of curing of thermoset resin. The method includes disposing one or more thermoset resin layers in a layup; disposing one or more heaters in the layup, wherein each of the one or more heaters includes two electrodes, wherein the two electrodes of each of the one or more heaters are couplable to an external electricity source when the one or more heaters are disposed in the layup; and providing enough electricity to the electrodes of each of the one or more heaters to cause the one or more heaters to heat the layup to fully cure the one or more thermoset resin layers to form a cured laminate.

20 Claims, 6 Drawing Sheets

(56) References Cited

OTHER PUBLICATIONS

Tarfaoui, M., A.E. Moumen, M. Boehle, O. Shah, K. Lafdi, Self-heating and deicing epoxy/glass fiber based carbon nanotubes buckypaper composite, J. Mater. Sci., vol. 54 (2019), pp. 1351-1362. (Year: 2019).*

Robertson, I.D. et al., Rapid energy-efficient manufacturing of polymers and composites via frontal polymerization, Nature, vol. 557 (May 10, 2018), 12 pages. (Year: 2018).*

Mayank Garg, et al., Rapid synchronized fabrication of vascularized thermosets and composites. Nature Communications (2021) 12:2836.

Naseri, Iman, et al. "Electrothermal Performance of Heaters Based on Laser-Induced Graphene on Aramid Fabric." ACS Omega (2022).

* cited by examiner

DEVICE AND METHOD FOR RAPID MANUFACTURING OF MULTIFUNCTIONAL COMPOSITES

CROSS-REFERENCE TO RELATED APPLICATIONS

This application claims the benefit of U.S. Provisional Patent Application No. 63/057,658, filed Jul. 28, 2020, the contents of which are incorporated herein by reference in their entirety.

BACKGROUND

Fiber-reinforced polymer composite ("FRPC") materials are integral to aerospace, automotive, marine, sport, and energy industries as well as the next generation of lightweight, energy-efficient structures, owing to their excellent specific stiffness and strength, thermal stability, and chemical resistance. However, widespread and economical adoption of FRPCs is currently limited, mainly due to the existing, inefficient manufacturing processes.

Conventional manufacture of high-performance FRPC components requires the matrix thermoset resin to be cured at elevated temperatures (ca. 180° C.) for several hours under combined external pressure and internal vacuum using large autoclaves or ovens that scale in size with the component. This traditional manufacturing approach is slow, requires a large amount of energy, and involves significant capital investment, leading to a high cost of manufacturing and low production rates. Moreover, lack of all key functional properties required for a structural system (e.g., electrical and thermal conductivity, damage and impact tolerance) often results in suboptimal structural design and performance of FRPCs.

Thus, a need exists for a method of manufacturing FRPC components that is fast, energy efficient, cost efficient, and provide functional properties to the resulting product.

SUMMARY

Various implementations include a method of curing of thermoset resin. The method includes disposing one or more thermoset resin layers in a layup; disposing one or more heaters in the layup, wherein each of the one or more heaters includes two electrodes, wherein the two electrodes of each of the one or more heaters are couplable to an external electricity source when the one or more heaters are disposed in the layup; and providing enough electricity to the electrodes of each of the one or more heaters to cause the one or more heaters to heat the layup to fully cure the one or more thermoset resin layers to form a cured laminate.

In some implementations, one of the heaters is disposed in the layup before a first thermoset resin layer is disposed in the layup or after a last thermoset resin layer is disposed in the layup.

In some implementations, the one or more thermoset resin layers includes a first thermoset resin layer and a second thermoset resin layer, and one of the heaters is disposed in the layup between the first thermoset resin layer and the second thermoset resin layer.

In some implementations, at least one of the heaters is an integral part of the cured laminate.

In some implementations, heat from the one or more heaters is the only stimulus applied to the layup to cause curing of the one or more thermoset resin layers in the layup.

In some implementations, the method further includes disposing one or more sacrificial polymer components in the layup before providing electricity to the electrodes. The one or more sacrificial polymer components thermally degrade to form one or more channels defined within the cured laminate when the layup is heated by the one or more heaters.

In some implementations, the one or more heaters include buckypaper. In some implementations, the one or more heaters include one or more wires. In some implementations, the one or more heaters include conductive ink. In some implementations, the one or more heaters include graphene.

In some implementations, the one or more thermoset resin layers include an embedded reinforcing material. In some implementations, the embedded reinforcing material includes woven fibers. In some implementations, the embedded reinforcing material includes glass fibers. In some implementations, the embedded reinforcing material includes carbon fibers.

In some implementations, the one or more thermoset resin layers include a cyclic olefin. In some implementations, the one or more thermoset resin layers include an epoxy. In some implementations, the one or more thermoset resin layers include a polyurethane. In some implementations, the one or more thermoset resin layers include an acrylate. In some implementations, the one or more thermoset resin layers include a thiolene.

In some implementations, an electronic control unit ("ECU") is in electrical communication with the electrodes of at least one of the heaters. In some implementations, the ECU is configured to determine a change in resistance across the at least one of the heaters. In some implementations, the ECU is configured to cause electrical current to flow through the at least one of the heaters.

Various other implementations include a laminate polymer device. The device includes one or more fully cured polymer layers and one or more heaters. The one or more fully cured polymer layers are disposed in a cured laminate. The one or more heaters are disposed in the cured laminate. Each of the one or more heaters includes two electrodes. The two electrodes of each of the one or more heaters are couplable to an external electricity source. Each of the one or more heaters is capable of creating enough heat to fully cure one or more thermoset resin layers to form the one or more fully cured polymer layers in the cured laminate.

In some implementations, one of the heaters is disposed as a first layer or a last layer in the cured laminate.

In some implementations, the one or more fully cured polymer layers includes a first fully cured polymer layer and a second fully cured polymer layer, and one of the heaters is disposed in the cured laminate between the first fully cured polymer layer and the second fully cured polymer layer.

In some implementations, at least one of the heaters is an integral part of the cured laminate.

In some implementations, the device further includes one or more channels defined within the cured laminate.

In some implementations, the one or more heaters include buckypaper. In some implementations, the one or more heaters include one or more wires. In some implementations, the one or more heaters include conductive ink. In some implementations, the one or more heaters include graphene.

In some implementations, the one or more thermoset resin layers include an embedded reinforcing material. In some implementations, the embedded reinforcing material includes woven fibers. In some implementations, the embedded reinforcing material includes glass fibers. In some implementations, the embedded reinforcing material includes carbon fibers.

In some implementations, the one or more thermoset resin layers include a cyclic olefin. In some implementations, the one or more thermoset resin layers include an epoxy. In some implementations, the one or more thermoset resin layers include a polyurethane. In some implementations, the one or more thermoset resin layers include an acrylate. In some implementations, the one or more thermoset resin layers include a thiolene.

In some implementations, the device further includes an electronic control unit ("ECU") in electrical communication with the electrodes of at least one of the heaters. In some implementations, the ECU is configured to determine a change in resistance across the at least one of the heaters. In some implementations, the ECU is configured to cause electrical current to flow through the at least one of the heaters.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

Figure 1:
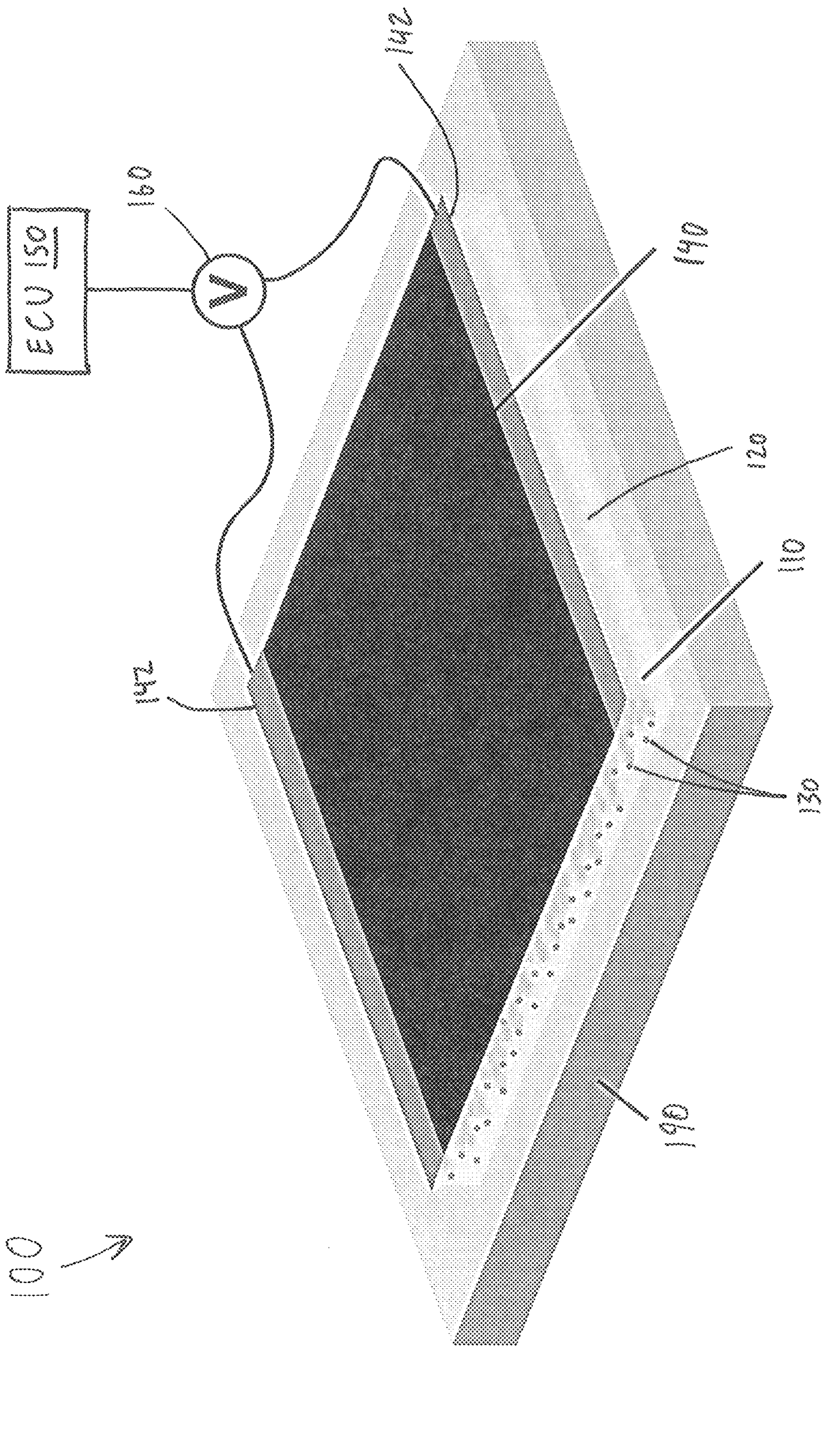
FIG. 1 is a perspective view of a device and method of curing of thermoset resin, according to one implementation.

The devices, systems, and methods disclosed herein provide for rapid, cost-effective manufacturing of multifunctional composites using a combination of triggered polymerization of thermoset resins and Joule heating of nanostructured films embedded in the composite layup.

The devices, systems, and methods disclosed herein provide for a technique for rapid, energy-efficient, and scalable manufacturing of high-performance, multifunctional FRPCs by exploiting triggered polymerization of thermoset resins, Joule heating of nanostructured materials, and thermal depolymerization of sacrificial polymers. As a result, a new generation of composites will be developed that are lightweight, cure rapidly with minimal energy input, and display multiple novel functionalities. To achieve this goal, composite laminates are be manufactured using new resin chemistries that are stable at room temperature and exhibit long working times (>5 hours) but can rapidly polymerize when the resin temperature is increased above a critical value (40-50° C.). Upon infusion of the resin into a stack of fiber reinforcements, the reaction will be activated through the thickness of the laminate via a thin, nanostructured heater film (e.g., carbon nanotube sheet) embedded as the outermost layer of the laminate.

The joule heating of the nanostructured film allows local heating of the resin and activation of the polymerization reaction along a very short distance (i.e., laminate thickness). As a result, the cure time is very short (from less than 2 minutes to 10 minutes) irrespective of the size and geometrical complexity of the composite product, while reducing energy requirements by more than four orders of magnitude compared to the conventional curing approaches.

Incorporation of sacrificial polymer templates, which thermally degrade into volatile monomers or products, in the layup enable simultaneous creation of vascular networks in the laminate for transport of functional fluids and imparting bioinspired functions such as self-healing, thermal regulation, and electromagnetic modulation. The local joule heating combined with the exothermic heat of reaction is sufficient to quickly depolymerize such an embedded sacrificial polymer template.

In addition, the integrated nanostructured film creates a conductive surface layer that is useful following the manufacturing process for displaying novel functions such as anti-icing/deicing, self-sensing of strain, and lightning strike protection. Using a similar approach, joule heating of the integrated nanostructured film can be tailored to enable thermal regulation to avoid ice formation on the surface of the component. The conductive surface layer can also work as a protective layer for lightning strike protection and electromagnetic interference (EMI) shielding. In addition, monitoring the electrical resistance between any two surface points allows for indirect measurement of surface deformation and strain under static and dynamic loading conditions.

Various implementations include a method of curing of thermoset resin. The method includes disposing one or more thermoset resin layers in a layup; disposing one or more heaters in the layup, wherein each of the one or more heaters includes two electrodes, wherein the two electrodes of each of the one or more heaters are couplable to an external electricity source when the one or more heaters are disposed in the layup; and providing enough electricity to the electrodes of each of the one or more heaters to cause the one or more heaters to heat the layup to fully cure the one or more thermoset resin layers to form a cured laminate.

Various other implementations include a laminate polymer device. The device includes one or more fully cured polymer layers and one or more heaters. The one or more fully cured polymer layers are disposed in a cured laminate. The one or more heaters are disposed in the cured laminate. Each of the one or more heaters includes two electrodes. The two electrodes of each of the one or more heaters are couplable to an external electricity source. Each of the one or more heaters is capable of creating enough heat to fully cure one or more thermoset resin layers to form the one or more fully cured polymer layers in the cured laminate.

FIG. 1 shows a method of curing of thermoset resin. In the first step of the method, one or more thermoset resin layers 110 are disposed in a layup 100. Each of the thermoset resin layers 110 can be deposited onto a build plate 190 from a feeder coupled to a CNC machine or in any other way known in the art. In other implementations, the thermoset resin layers can be deposited in a layup in any other way known in the art. In some implementations, the device does not include a build plate and the thermoset resin layer is output onto other thermoset resin, a tool/mold, or any other component that is not supported on a build plate. In some implementations, the device does not include a CNC, and the feeder is either stationary or is manually moved. In some implementations, the feeder is coupled to a robotic platform or a dispensing machine.

The thermoset resin used in the thermoset resin layers 110 shown in FIG. 1 can be any prepolymer known in the art, such as any monomer or oligomer. The prepolymer can be any self-sustaining reaction type prepolymer such as any frontal polymerization resin known in the art. The prepolymer can also be any non-self-sustaining reaction type prepolymer known in the art. In some implementations, the thermoset resin includes cyclic olefin, epoxy, polyurethane, acrylate, or thiolene. In some implementations, the thermoset resin could be a copolymer or hybrid of two or more resins.

The thermoset resin layers 110 shown in FIG. 1 includes woven continuous fibers 120 coated in a thermoset resin, but in other implementations, the thermoset resin includes discontinuous reinforcing fibers, nanoparticles, microparticles, any other reinforcing material known in the art, or any combination of two or more types of embedded reinforcing materials. In some implementations, the reinforcing material includes carbon, metal, glass, polymer, or any combination of two or more materials. In some implementations, the thermoset resin does not include any reinforcing materials.

Figure 2A:
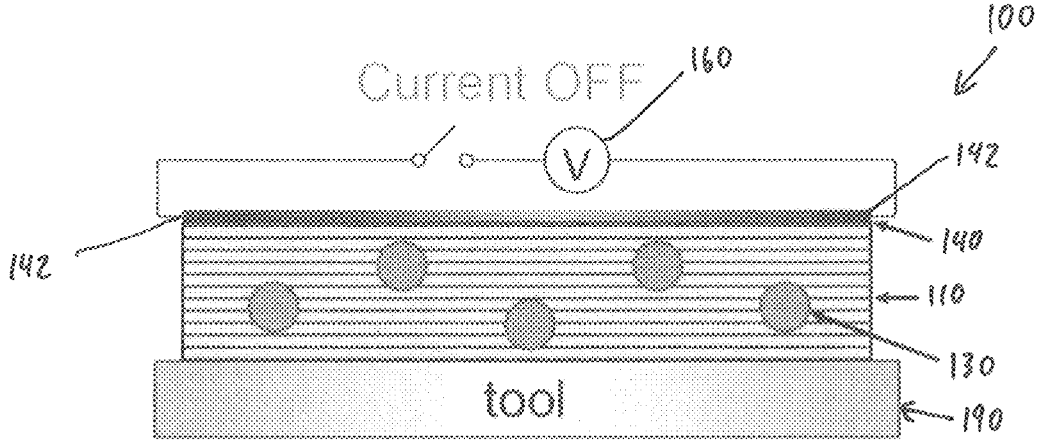
FIGS. 2A-2C are side views of the device of FIG. 1 showing channels in the cured laminate being formed by the degrading of sacrificial polymer components.
Figure 2B:
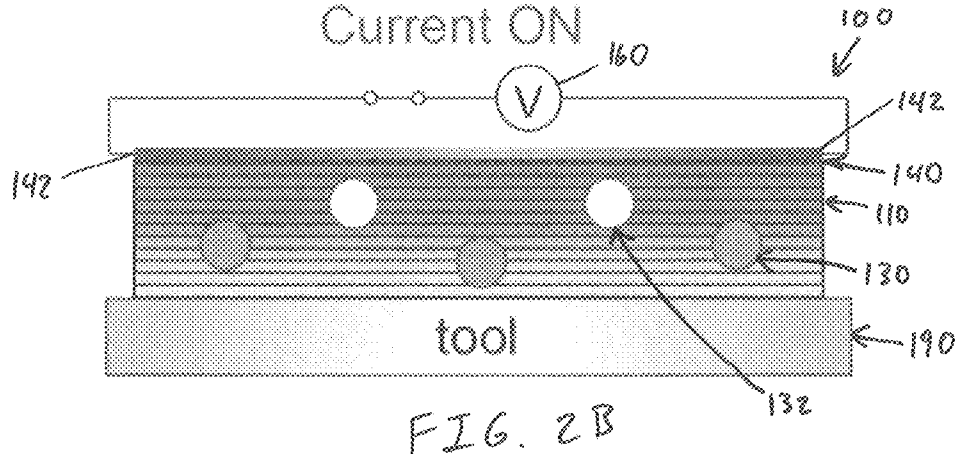
Figure 2C:
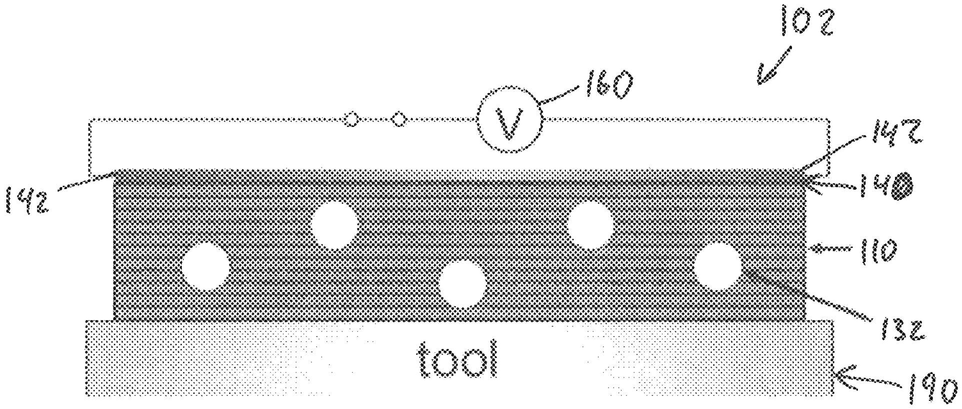

One or more sacrificial polymer components 130 are also disposed in the layup 100 within or between the thermoset resin layers 110, as shown in FIGS. 2A-2C. The sacrificial polymer components 130 are configured to thermally degrade to form one or more channels 132 defined within the cured laminate 102 when the layup 100 is heated by the one or more heaters 140, as discussed below.

Next, a heater 140 is disposed in the layup 100 on top of the thermoset resin layers 110. The heater 140 shown in FIG. 1 includes buckypaper. The heater 140 also includes two electrodes 142 that are couplable to an external electricity source 160 when the one or more heaters 140 are disposed in the layup 100. When electricity is provided to the electrodes 142 of the heater 140, the electricity causes the one or more heaters 140 to heat the layup 100 to fully cure the one or more thermoset resin layers 110 to form a cured laminate 102. The heater 140 provides enough heat to the layup 100 that the heat from the heater 140 is the only stimulus applied to the layup 100 to cause curing of the one or more thermoset resin layers 110 in the layup 100. The heat from the heaters 140 and from the polymerization process is also enough energy to thermally degrade the sacrificial polymer components 130 within the layup 100, causing channels 132 to form within the resulting cured laminate 102.

Figure 3A:
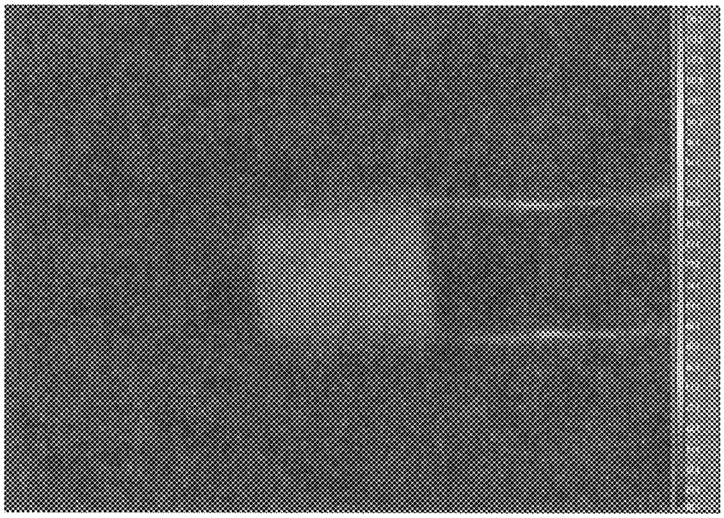
FIGS. 3A-3F are thermal imaging of the curing process of the device of FIG. 1 when electricity is supplied to the heater of the device at 15 seconds, 30 seconds, 45 seconds, 60 seconds, 75 seconds, and 90 seconds, respectively.
Figure 3B:
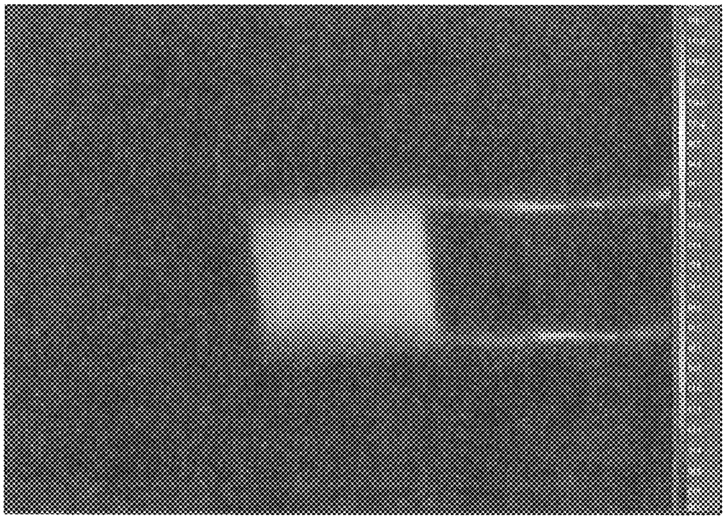
Figure 3C:
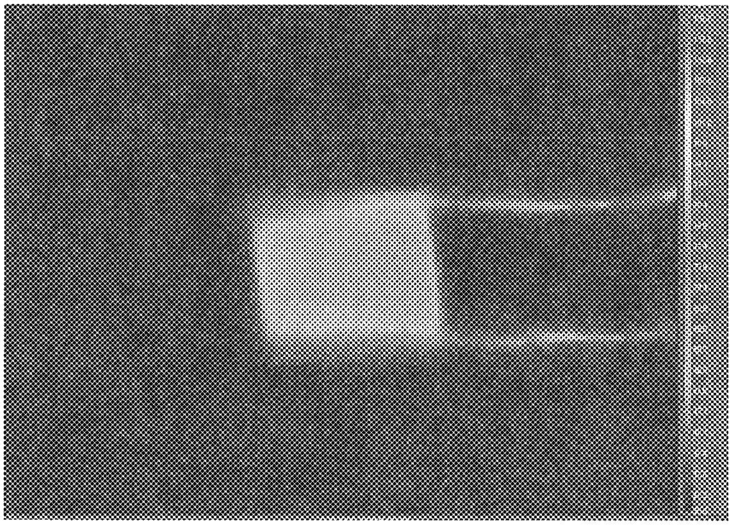
Figure 3D:
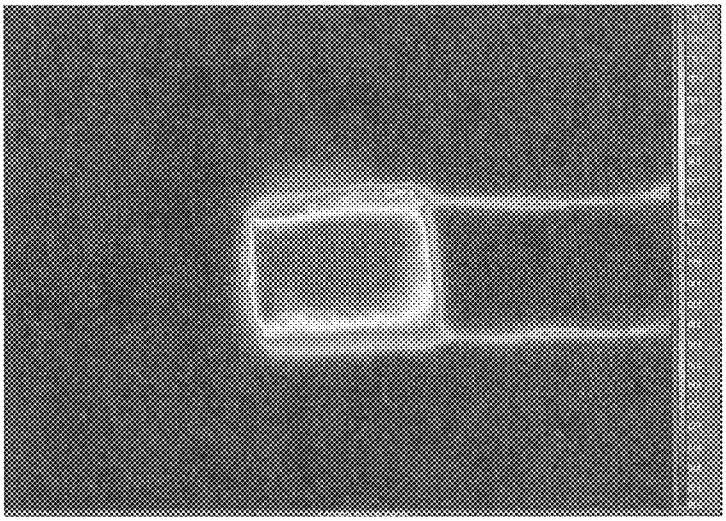
Figure 3E:
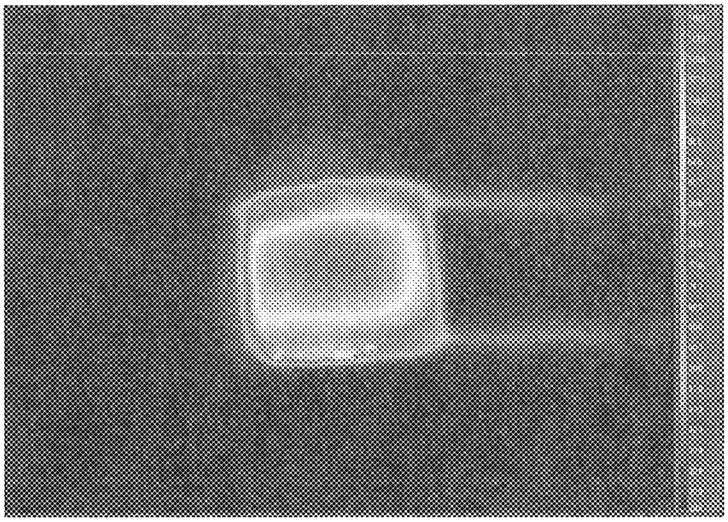
Figure 3F:
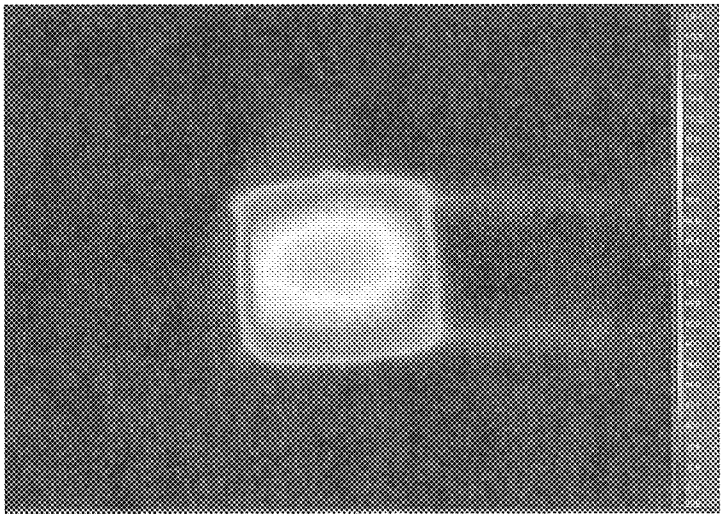
Figure 4:
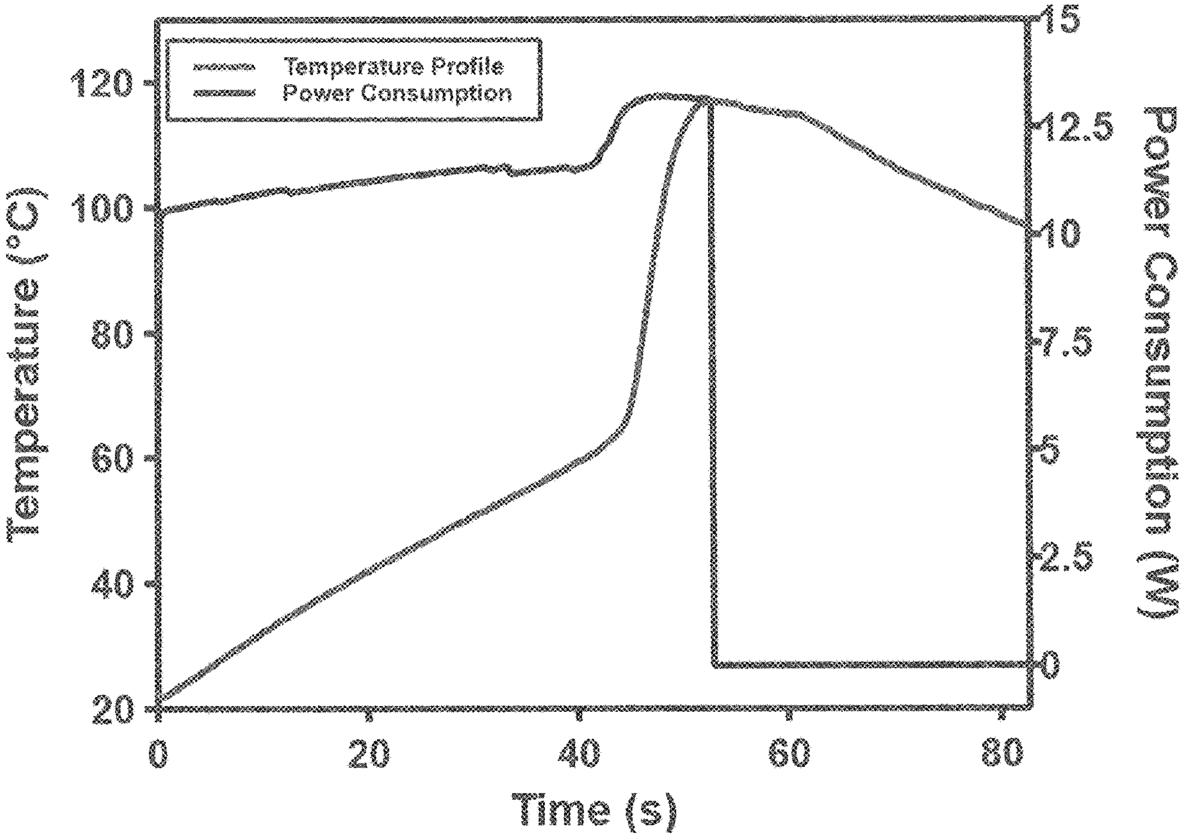
FIG. 4 is a graph of the temperature and power consumption over time of the curing process shown in FIGS. 3A-3F.

FIGS. 3A-3F show thermal imaging of the curing process of a sample device. Electricity is supplied to electrodes of the heater of the device and the thermal images are captured at 15 seconds (FIG. 3A), 30 seconds (FIG. 3B), 45 seconds (FIG. 3C), 60 seconds (FIG. 3D), 75 seconds (FIG. 3E), and 90 seconds (FIG. 3F). FIG. 4 shows a graph of the temperature and power consumption data of the device during the curing process.

The heater 140 shown in FIG. 1 is disposed in the layup 100 after a last thermoset resin layer 110 is disposed in the layup 100. However, in other implementations, the heater is disposed in the layup before a first thermoset resin layer is disposed in the layup. In some implementations, the one or more thermoset resin layers includes a first thermoset resin layer and a second thermoset resin layer, and one of the heaters is disposed in the layup between the first thermoset resin layer and the second thermoset resin layer.

In some implementations, the method includes disposing any number of one or more heaters within the layup. Although the heater 140 shown in FIG. 1 includes buckypaper, in other implementations, the heater includes one or more wires, conductive ink, graphene, or any other material capable of producing enough heat to heat the layup to fully cure the one or more thermoset resin layers to form a cured laminate when electricity is supplied to the heater.

Once the heat from the heater 140 has fully cured the layup 100 into a cured laminate 102, the heater 140 becomes an integral part of the cured laminate 102 and cannot be removed from the cured laminate 102.

Figure 5A:
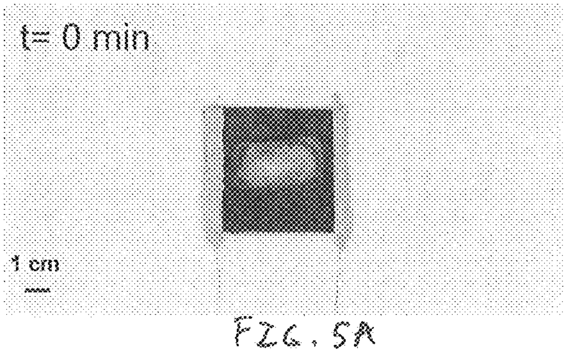
FIGS. 5A-5D show the device of FIG. 1 being used for deicing.
Figure 5B:
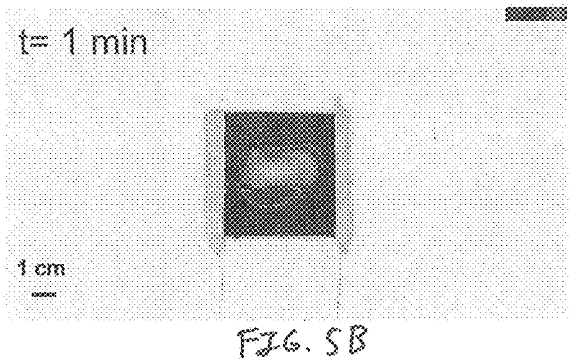
Figure 5C:
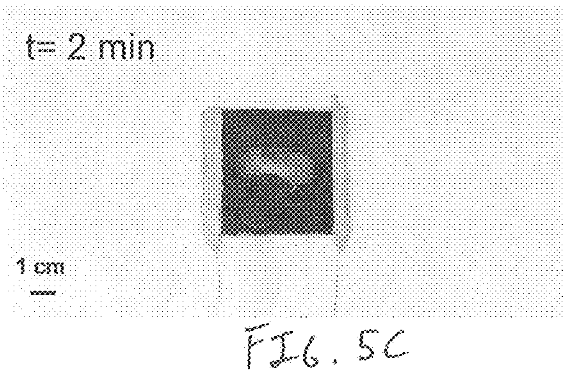
Figure 5D:
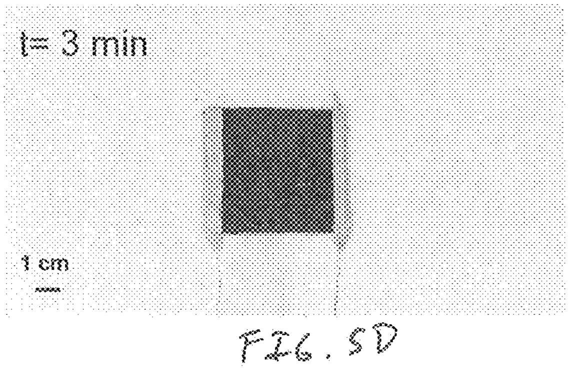

Including a heater 140 in the cured laminate 102 provides several benefits. A structure including one or more cured laminates 102 as described herein can act as lightening protection by electrically coupling the electrodes 142 of the heaters 140 together to disperse the charge from the lightening. The electrodes 142 of the heaters 140 can also be coupled to an electricity source 160 to cause the heaters 140 to heat the cured laminate 102 structure, such as for deicing. FIGS. 5A-5D show a sample device being used to melt ice at 0 minutes (FIG. 5A), 1 minute (FIG. 5B), 2 minutes (FIG. 5C), and 3 minutes (FIG. 5D).

The electrodes 142 can be coupled to an electronic control unit ("ECU") 150 such that the ECU 150 can control the amount of electricity supplied to the heaters 140. The ECU 150 can also be configured to determine a change in resistance across at least one of the heaters 140 such that the heaters 140 can act as a strain gauge.

The channels 132 in the cured laminate 102 shown in FIGS. 2A-2C that were formed by the sacrificial polymer components 130 can allow fluids to flow through a cured laminate structure 102. One or more channels 132 formed in each of the cured laminates 102 in a structure can be in fluid communication with one or more channels 132 formed in another cured laminate 102 in the structure to allow fluid to flow from one cured laminate 102 to another cured laminate 102. The fluids flowing through the channels 132 can be heated or cooled to provide convective heating or cooling through the structure.

The fluid can also include a thermoset resin to allow for self-healing of the structure. In a situation in which a cured laminate 102 in a structure is damaged and one or more channel 132 is breached, a thermoset resin can be caused to flow through the one or more breached channels 132 to the damaged portion. Once the thermoset resin exits the breach of the one or more channels 132, electricity can be provided to the electrodes 142 of the cured laminate 102 to cause the heaters 140 to provide heat to the thermoset resin. The heat can cause the thermoset resin to cure within the damaged portion of the structure to repair the damaged portion.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A method of curing of thermoset resin, the method comprising:

disposing one or more thermoset resin layers in a layup, wherein the thermoset resin comprises a frontal polymerization resin;

disposing one or more sheet heaters in the layup, wherein each of the one or more sheet heaters includes two electrodes, wherein the two electrodes of each of the one or more sheet heaters are couplable to an external electricity source when the one or more sheet heaters are disposed in the layup;

providing enough electricity to the electrodes of each of the one or more sheet heaters to cause the one or more sheet heaters to heat the layup to activate the polymerization of the one or more thermoset layers;

once polymerization is activated to establish a polymerization front, stop providing electricity to the electrodes of each of the one or more sheet heaters to cause the one or more thermoset resin layers to continue to polymerize into a fully cured laminate such that at least one of the one or more sheet heaters is an integral part of the cured laminate;

decoupling the two electrodes of each of the one or more sheet heaters from the external electricity source; and coupling the two electrodes of at least one of the one or more sheet heaters to an electrical circuit, wherein the electrical circuit is separate from the external electricity source, wherein the electrical circuit comprises an electronic control unit ("ECU") configured to determine a change in resistance across the at least one of the sheet heaters such that the at least one of the sheet heaters acts as a strain gauge.

2. The method of claim 1, wherein one of the sheet heaters is disposed in the layup before a first thermoset resin layer is disposed in the layup or after a last thermoset resin layer is disposed in the layup.

3. The method of claim 1, wherein the one or more thermoset resin layers includes a first thermoset resin layer and a second thermoset resin layer, and one of the sheet heaters is disposed in the layup between the first thermoset resin layer and the second thermoset resin layer.

4. The method of claim 1, wherein heat from the one or more sheet heaters is the only stimulus applied to the layup to cause curing of the one or more thermoset resin layers in the layup.

5. The method of claim 1, further comprising disposing one or more sacrificial polymer components in the layup before providing electricity to the electrodes, wherein the one or more sacrificial polymer components thermally degrade to form one or more channels defined within the cured laminate when the layup is heated by the one or more sheet heaters.

6. The method of claim 1, wherein the one or more sheet heaters include buckypaper.

7. The method of claim 1, wherein the one or more sheet heaters include conductive ink.

8. The method of claim 1, wherein the one or more sheet heaters include graphene.

9. The method of claim 1, wherein the one or more thermoset resin layers include an embedded reinforcing material.

10. The method of claim 9, wherein the embedded reinforcing material includes woven fibers.

11. The method of claim 9, wherein the embedded reinforcing material includes glass fibers.

12. The method of claim 9, wherein the embedded reinforcing material includes carbon fibers.

13. The method of claim 1, wherein the one or more thermoset resin layers include a cyclic olefin.

14. The method of claim 1, wherein the one or more thermoset resin layers include an epoxy.

15. The method of claim 1, wherein the one or more thermoset resin layers include a polyurethane.

16. The method of claim 1, wherein the one or more thermoset resin layers include an acrylate.

17. The method of claim 1, wherein the one or more thermoset resin layers include a thiolene.

18. The method of claim 1, wherein the ECU is configured to cause electrical current to flow through the at least one of the sheet heaters.

19. The method of claim 1, wherein stopping providing electricity to the electrodes of each of the one or more sheet heaters to cause the one or more thermoset resin layers to continue to polymerize into a fully cured laminate occurs prior to at least a portion of the thermoset resin beginning to cure.

20. A method of curing of thermoset resin, the method comprising:

disposing one or more thermoset resin layers in a layup, wherein the thermoset resin comprises a frontal polymerization resin;

disposing two or more sheet heaters in the layup, wherein each of the two or more sheet heaters includes two electrodes, wherein the two electrodes of each of the two or more sheet heaters are couplable to an external electricity source when the two or more sheet heaters are disposed in the layup;

providing enough electricity to the electrodes of each of the two or more sheet heaters to cause the two or more sheet heaters to heat the layup to activate the polymerization of the one or more thermoset layers;

once polymerization is activated to establish a polymerization front, stop providing electricity to the electrodes of each of the two or more sheet heaters to cause the one or more thermoset resin layers to continue to polymerize into a fully cured laminate such that at least one of the two or more sheet heaters is an integral part of the cured laminate; and electrically coupling the electrodes of the at least one of the two or more sheet heaters together to disperse electrical charge from lightning for lightning strike protection.

* * * * *